US011983984B2

(12) United States Patent
Mendes Francisco

(10) Patent No.: US 11,983,984 B2
(45) **Date of Patent: *May 14, 2024**

(54) GAME MODE SOFTWARE AND METHOD OF PLAY

(71) Applicant: Drako Limited, Saint Julians (MT)

(72) Inventor: Rui Manuel Mendes Francisco, Geneva (CH)

(73) Assignee: Drako Limited, Saint Julians (MT)

( * ) Notice: Subject to any disclaimer, the term of this patent is extended or adjusted under 35 U.S.C. 154(b) by 0 days.

This patent is subject to a terminal disclaimer.

(21) Appl. No.: 17/952,246

(22) Filed: Sep. 24, 2022

(65) Prior Publication Data

US 2023/0014568 A1 Jan. 19, 2023

Related U.S. Application Data

(62) Division of application No. 16/930,145, filed on Jul. 15, 2020, now Pat. No. 11,468,729.

(51) Int. Cl.

*G07F 17/32* (2006.01)

*A63F 3/06* (2006.01)

(52) U.S. Cl.

CPC ........ *G07F 17/3213* (2013.01); *A63F 3/0645* (2013.01); *G07F 17/3262* (2013.01); *G07F 17/3293* (2013.01)

(58) Field of Classification Search

CPC ............. G07F 17/3213; G07F 17/3262; G07F 17/3293; A63F 3/06; A63F 3/062; A63F 3/0645

See application file for complete search history.

(56) References Cited

U.S. PATENT DOCUMENTS 3,118,677 A * 1/1964 Lang .................... G07C 15/001 273/144 R 5,265,880 A * 11/1993 Maksymec ............. A63F 3/065 273/269

5,830,063 A * 11/1998 Byrne ................. G07F 17/3258 463/26

6,186,892 B1 * 2/2001 Frank .................... A63F 3/0645 463/19

6,368,214 B1 * 4/2002 Luciano .................... A63F 1/00 463/19

6,755,738 B2 * 6/2004 Glasson .................. G07F 17/32 463/19

(Continued)

FOREIGN PATENT DOCUMENTS

CN 111311844 A * 6/2020

*Primary Examiner* — Milap Shah

(74) *Attorney, Agent, or Firm* — Margaret S. Millikin

(57) ABSTRACT

A feature for electronic games installed in stand-alone electronic gaming machines, game playing devices, mobile devices and personal electronic devices or on a networked system of gaming machines, game playing devices mobile devices and personal electronic devices where prior to starting the game, the player can choose from a variety of game modes with different numbers of balls to be drawn and the number and layout of cards to be played. The player is offered via the machine hard buttons or touch screen to choose the number balls and number and layout of cards. This invention may be applied to bingo and various types of games with balls, numbers or symbols in various types and patterns.

24 Claims, 11 Drawing Sheets

(56) References Cited

U.S. PATENT DOCUMENTS

| | | | | |
|---|---|---|---|---|
| 6,824,465 | B2 * | 11/2004 | Luciano, Jr. | G07F 17/3262 463/19 |
| 7,708,634 | B2 * | 5/2010 | Padgett | G07F 17/32 463/31 |
| 7,727,064 | B1 * | 6/2010 | Luciano, Jr. | G07F 17/329 463/19 |
| 7,874,907 | B2 * | 1/2011 | Lozano | G07F 17/32 463/19 |
| 8,123,606 | B2 * | 2/2012 | Hollibaugh | G07F 17/329 463/19 |
| 8,506,384 | B2 * | 8/2013 | Coleman | G07F 17/3286 463/19 |
| 8,602,864 | B1 * | 12/2013 | Lewis | G07F 17/3244 463/18 |
| 10,360,765 | B2 * | 7/2019 | Berman | G07F 17/3276 |
| 11,468,729 | B2 * | 10/2022 | Mendes Francisco | A63F 3/0645 |
| 2001/0034262 | A1 * | 10/2001 | Banyai | A63F 3/081 463/17 |
| 2004/0009806 | A1 * | 1/2004 | Odom | A63F 3/062 463/19 |
| 2004/0063491 | A1 * | 4/2004 | Banyai | G07F 17/329 463/22 |
| 2004/0251628 | A1 * | 12/2004 | Kilby | A63F 3/062 273/269 |
| 2004/0259622 | A1 * | 12/2004 | Duhamel | G07F 17/3244 463/16 |
| 2005/0227753 | A1 * | 10/2005 | Luciano, Jr. | G07F 17/3244 463/18 |
| 2005/0250572 | A1 * | 11/2005 | Kane | G07F 17/329 463/17 |
| 2006/0121977 | A1 * | 6/2006 | Odom | A63F 3/062 463/19 |
| 2006/0160603 | A1 * | 7/2006 | Lulek | G07F 17/3276 463/19 |
| 2006/0189368 | A1 * | 8/2006 | Goss | A63F 3/06 463/16 |
| 2007/0155471 | A1 * | 7/2007 | Powell | G07F 17/3286 463/19 |
| 2007/0257430 | A1 * | 11/2007 | Hardy | G07F 17/329 273/139 |
| 2008/0248863 | A1 * | 10/2008 | Seymour | G07F 17/32 463/31 |
| 2009/0075714 | A1 * | 3/2009 | Meyer | G07F 17/32 463/19 |
| 2009/0312082 | A1 * | 12/2009 | Hsu | G07F 17/32 463/19 |
| 2014/0248935 | A1 * | 9/2014 | Williams | A63F 3/062 463/19 |
| 2014/0274278 | A1 * | 9/2014 | Elias | G07F 17/326 463/19 |
| 2017/0326442 | A1 * | 11/2017 | Leake | A63F 3/062 |
| 2019/0102968 | A1 * | 4/2019 | Ludwick | G07F 17/3267 |
| 2022/0005309 | A1 * | 1/2022 | Welch | A63F 3/0645 |

* cited by examiner

GAME MODE SOFTWARE AND METHOD OF PLAY

TECHNICAL FIELD OF THE INVENTION

The present invention relates generally to devices, software and methods for providing electronic games having one or more playing cards. More particularly, the present invention relates to devices, software and methods for providing an electronic game wherein the player selects the number of bingo balls drawn. Finally, the present invention relates to devices, software and methods for providing an electronic game implemented on stand-alone electronic gaming machines, game playing devices, mobile devices and personal electronic devices; or on a networked system of gaming machines, game playing devices, mobile devices and personal electronic devices.

SUMMARY OF THE INVENTION

The invention is directed to a computer-implemented method for operating an electronic game based on cards with a matrix of values and draw balls to match with these values on the cards, the method performed by at least one hardware device including a processor, visual display screen, and a non-transitory computer-readable medium. The method comprises receiving one or more player inputs on the hardware device indicating a number of balls selected for drawing in the electronic game until a final input is received finalizing a selection of the number of balls to be drawn; generating a display element indicating the number of balls selected for drawing in the electronic game using at least a physical representation of each ball selected; and upon receiving the final input finalizing the selection of the number of balls to be drawn, drawing the number of balls in accordance with the one or more player inputs.

The present invention further is directed to a system for providing an electronic game performed on one or more hardware devices, including one or more gaming interfaces comprising a visual display screen, a processor and a non-transitory computer-readable medium. The gaming in interfaces receiving one or more player inputs on the hardware device indicating a number of balls selected for drawing in the electronic game until a final input is received finalizing a selection of the number of balls to be drawn; generating a display element indicating the number of balls selected for drawing in the electronic game using at least a physical representation of each ball selected; and upon receiving the final input finalizing the selection of the number of balls to be drawn, drawing the number of balls in accordance with the one or more player inputs.

The invention further is directed to a non-transitory computer-readable storage medium that when combined with a programmable device performs the following functions: receiving one or more player inputs on the hardware device indicating a number of balls selected for drawing in the electronic game until a final input is received finalizing a selection of the number of balls to be drawn; generating a display element indicating the number of balls selected for drawing in the electronic game using at least a physical representation of each ball selected; and upon receiving the final input finalizing the selection of the number of balls to be drawn, drawing the number of balls in accordance with the one or more player inputs.

The present invention further is directed to a non-transitory computer-readable storage medium that when combined with a programmable device performs the following functions: receive from a user an input indicating a number of bingo balls selected for drawing in a bingo game until a player input is received finalizing selection; display an element indicating said number of bingo balls using at least a physical representation of each bingo ball to be selected to the user; upon receiving the finalizing input drawing a number of balls, for the bingo game, in accordance with the selection of the user.

The invention further is directed to a device for playing an electronic game. The device comprises a processor; a visual display screen; and a computer-readable medium; wherein the device generates responsive to a user selection for the electronic bingo game, a group of one or more electronic cards wherein each card comprises a matrix of positions, each position comprising an assigned value taken from a finite set of pre-determined numbers values; displaying on the display screen the group of cards wherein the matrix of values is display for each card; providing the user on the display screen, a selection designating a number of balls for drawing, the selector providing a visual preview of the number of balls that will be drawn responsive to user selection until said selection is finalized; responsive to user selection drawing a group of balls comprising a group of values selected from the set of predetermined values, wherein the number of balls drawn is determined by input from a user; generating, on the visual display screen, a visual indicator comprising the values of the balls drawn responsive to the finalization of user selection; comparing the symbolic value of each ball in said group of balls to the symbolic value of each position in the matrix of positions in each electronic card of the one or more electronic bingo cards of the electronic game to and creating a match corresponding to the symbolic value of said position if a match is determined possible; for each matrix of positions corresponding to a card, determining if there are matches present in a pattern pre-designated as a winning pattern, and designating the card as a winning card in association with said particular winning pattern and assigning a numeric value greater than zero to the card based upon its numeric value; and provide rewards to the user based on reward values associated with a pay-table corresponding to any winning patterns determined.

DETAILED DESCRIPTION OF THE INVENTION

Figure 1:
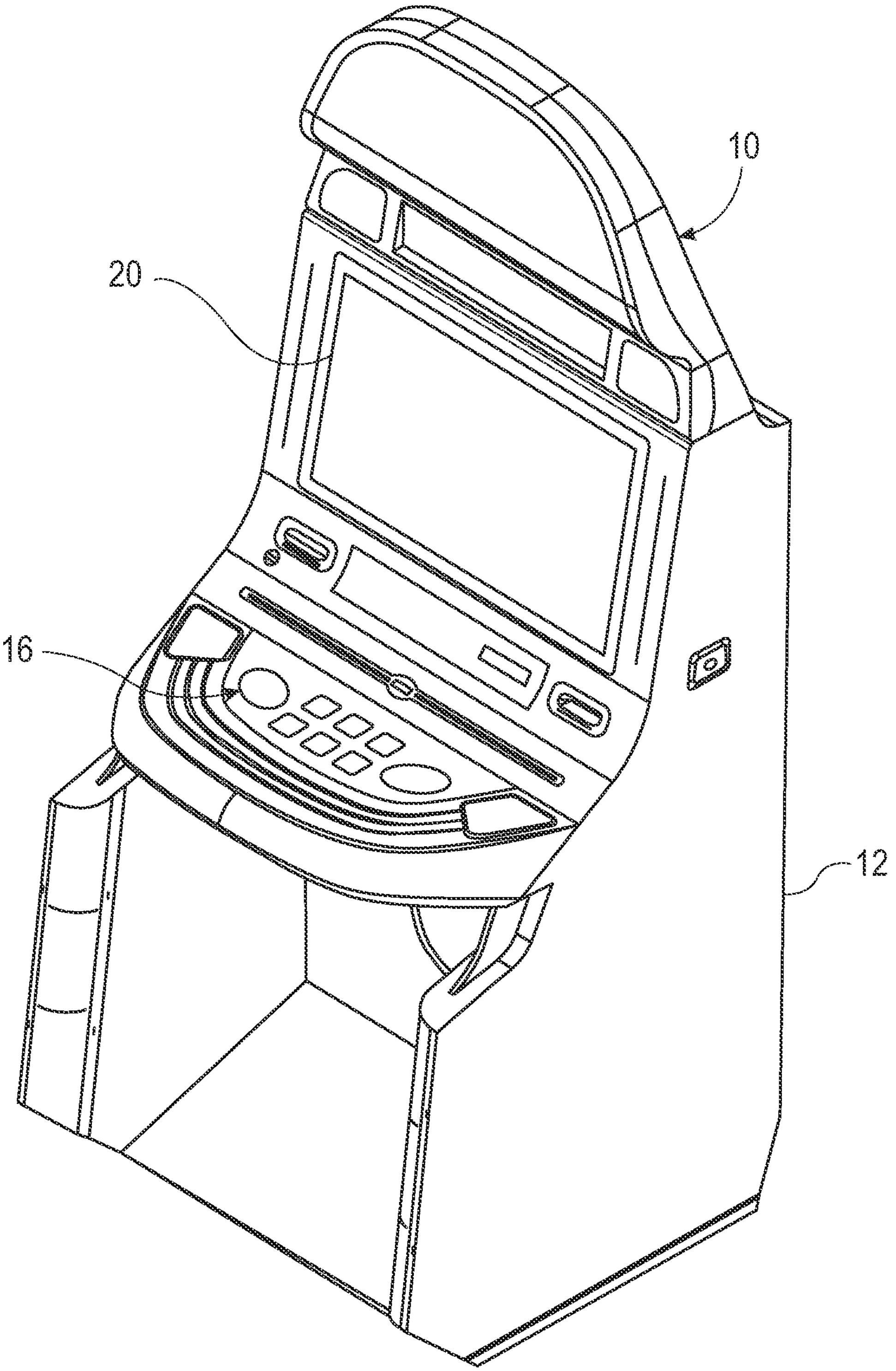
FIG. 1 illustrates an exemplary gaming machine that may be configured to implement the present invention.

Gaming, in the global community, is a multifaceted industry subject to constant innovation within the legal structures of a plurality of varying jurisdictions. In the United States, gaming is divided into three major classes of which bingo and bingo-like games are classified as either Class II or Class III. Class II gaming includes bingo and non-banked card games. Class III gaming includes all other forms of gambling, including bingo-based casino-style gambling. By way of example, bingo games of the present invention may include games played for rewards, including monetary prizes, with cards bearing numbers and/or other symbols in which game players holding said cards with or without daub, cover or match said numbers and/or symbols when the matching numbers and/or symbols and/or other values are drawn, normally in random order, from pool containing a complete set of the numbers and/or symbols and/or other values available for gameplay. The game is won by a player matching a group of numbers and/or symbols and/or other values in such a way as to form a particular pattern pre-designated by the rules of the particular game as a "winning pattern." More complicated patterns are sometimes designated for higher levels of rewards.

In traditional bingo games, the cards are printed and the pool of numbers and/or symbols and/or other values comprising the complete set of numbers and/or symbols and/or other values, are each placed on and individual physical spherical device commonly called "bingo balls." Said bingo balls are mixed by mechanical means in a container and selected individual or in groups at random. A winner is determined by a player self-identifying an accurate winning pattern, which is verified by a human officiant, on one or more of the player's cards. Gameplay is therefore focused on a local group of players, playing against each other, and normally within visual or listening distance of the entity drawing the bingo balls, normally a human operator. Variations on traditional printed card bingo include standard play where one or more bingo cards are pre-purchased by players, and non-standard or "bonanza" play, where a number of balls are drawn, and then players are permitted to purchase one or more bingo cards.

In modern Class II bingo gaming arrangements, one or more of the elements of the traditional bingo game are modified for use within an electronic system. Electronic, computer, and other technologic aids are employed in the play of Class II bingo games. Class II gaming also includes non-banked card games, that is, games that are played exclusively against other players rather than against the house or a player acting as a bank. The game cards for players and drawing of balls are handled by computer software in an electronic game environment. These electronic elements fundamentally alter the traditional aspects of bingo game play. Replacing printed bingo cards with electronic tracking eliminates waste and makes it more feasible for a player to play multiple bingo cards, increasing the speed of gameplay and overall player interest in the game. Replacing a mechanical drawing means with an electronic random selection algorithm speeds game play also, and allows a human selector to be eliminated from the process, making a bingo game feasible with fewer players (even a single player) than would be fiscally feasible where human operators are required. The combination of these two, electronic cards and electronic selection, allows automatic matching which eliminates the need for the aforementioned human officiant, and further opens the possibility of a user playing multiple games of bingo, potentially hundreds or more, in a shorter span of time, as little as a few seconds.

Class III gaming includes all forms of gaming that are not categorized in Class I or Class II. Games commonly played at casinos, such as slot machines, blackjack, craps, and roulette, as well as bingo wagering games and electronic facsimiles of any game of chance. Generally, Class III is often referred to as casino-style gaming. Class III gaming includes technologic devices that are electronic or electro-mechanical facsimiles of a game of chance or slot machines. The present invention is adaptable for play in Class II and Class III gambling.

With electronic Class II and Class III gaming, which have the power to deliver hundreds of bingo games to a player in a span of seconds or less, even traditional non-bingo means of gaming may be electronically simulated. The elements of a traditional game may be emulated and displayed electronically while the underlying odds and chance of a payout or managed invisibly to the user through an electronic bingo game.

The primary goal for success in an individual Class II or Class III gaming system is maintaining player interest. Aspects of modern electronic gaming can be used to enhance a player's interest, such as image sequences, animations, auditory encouragement in the form of sounds or musical output, and calculated estimates of likely prize payouts based on continued play or selections by a user.

Even with all these options for Class II and Class (III) gaming, many players maintain a desire for some of the traditional aspects of bingo to be present in their gaming experience. For this reason, a bingo game is desirable that maintains a user's interest by enabling the player to focus on a traditional aspect of bingo, such as the drawing of individual or groups of bingo balls, but alter it in a way facilitated by electronic play that gives user the feeling of play control, such as permitting said user to decide the manner of the drawing of balls on a game-by-game or play-by-play basis.

The invention is directed to a feature for bingo games for play on electronic gaming technology ("EGT") in a Class II or Class III application wherein, before starting the game, the player can choose a certain "game mode" with a different number of balls to be drawn. As used herein, EGT includes casino-style gaming machines, personal electronic devices, smart phones, tablets, laptops and personal computers.

The subject invention is directed to a feature applicable to a Class II or Class III game that runs on EGT's with balls bearing numbers and/or symbols and/or other values. The feature is applicable to games based on cards with a matrix of values and draw balls to match with these values. For example, keno and any kind of bingo that uses a set of values and balls indifferent to the universe of balls and values or type of matrix used in the card. In operation of the game, the player may choose different types of games to define the number of balls to be drawn before starting the draw. The game mode feature provides an option and configuration that varies gameplay and affects how other game mechanics behave. Several game modes are presented with different settings in each mode, which changes how a particular element of the game is played.

The present invention offers the player, via the EGT hard buttons or touch screen, the opportunity to choose the number of balls for game play. The invention can be applied to various types of bingo games, keno games, and other games with balls, numbers, symbols or other values in various types and patterns. As used herein, the term "value"

or "values" means a representation of an entity that can be manipulated by the software, including numbers, symbols, balls, and/or other variables.

For the purposes of the present discussion of the invention, the language should not be considered so as to limit the scope of the invention. Terms like "an example," "exemplary", "including", "such as" and "and the like" should not be interpreted to limit subject matter to only descriptions that follow them. These terms should be interpreted as "including but not limited to."

For the purpose of the present discussion, a user may constitute an organization or individual. An organization may constitute any group of persons acting together, including a government, corporation, educational institution, military branch, or tribal entity.

A computing environment is an environment to support activities by any organization or individual through the use of one or more programmable devices or computers. A computer is comprised of a means of receiving input, a means of processing said input, and a means of providing output. A computing environment may be, but is not limited to, any collection of computing resources for carrying out one or more tasks involving information or data processing. An example of a computing environment includes various computing devices spread across a network, wherein the network resources are in one or more physical locations. Network resources include web servers, file servers, on the Internet or an intranet, files and local computer-readable storage media.

As used herein, all references to computer readable storage media encompass any media which may be processed by a computing device including but not limited to all non-transitory means of storing computer data such as punch cards, magnetic media including removable disks, hard disks and tapes, random access memory (RAM), read only memory (ROM), optical media such as compact discs (CD), digital video disks (DVD), and solid state devices (SSD).

As used herein, network resources may be connected to each other by any means available including physical wiring and wireless transmissions. Physical wiring may include electrical means, such as twisted pair wiring, category 5 or Ethernet® wiring, coaxial cabling, and fiber optic cabling. Wireless frequency transmissions include any form of Wi-Fi, radio frequency transmission (RF), Bluetooth®, and optical wireless transmission such as laser or infrared. Standardized data signal protocols such as 802.11b may be used on either wired or wireless connections across the network.

The invention is directed to a feature to be implemented in any kind of bingo games with one or more cards where values are drawn. In one embodiment of the invention, the value is the number of balls to be drawn for game play and the player chooses, prior to starting the bingo game, how many balls the player wishes to draw. The invention applies to any type or format of bingo games. Bingo games are defined as games with one or more cards containing a matrix of numbers and/or symbols of any pattern regardless of the number of rows or columns, as well as any number of balls and/or symbols drawn, with a designated winning pattern determined upon the cards.

Turning now to the drawings in general, and to FIG. 1 in particular, there is shown therein an exemplary EGT 10 which includes a main cabinet 12, one or more display screens 20, which may be touchscreen or operated through controls 16, a CPU not shown, ticket printer, bill validator or bill acceptor, a sound system, which may include high-fi sound with a subwoofer, power supply, card readers, a button panel, wire harness, and illumination. The EGT 10 may be controlled by circuitry housed inside the main cabinet 12 of the machine 10. The invention also may be used in games provided through on-line gaming casinos to mobile devices and personal electronic devices, including tablets and mobile phones that use the IOS, Android, Windows or any other kind of operating system, and tablets, personal computers or laptops using MAC operating systems, Windows, Linux or other operational systems. The EGT 10 comprises one or more controllers 16 for selection of a number of values, such as selection of a number of cards 28 or a number of balls 30. Other hardware elements used for verifying the identity of the user, taking payment, dispensing rewards and other features that facilitate modern casino gaming may also be included, in accordance with the applicable laws of various jurisdictions.

Figure 2:
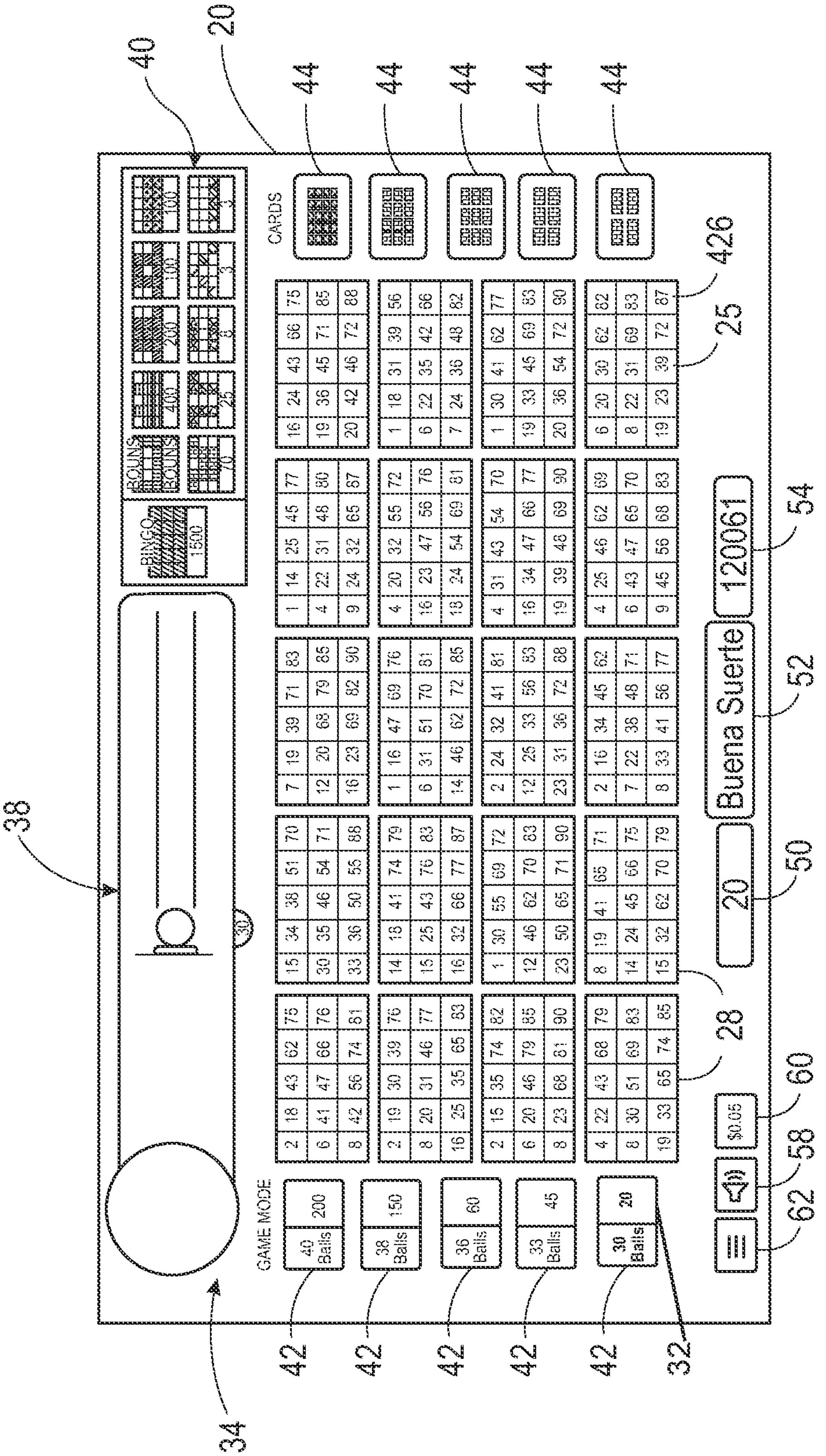
FIG. 2 illustrates an exemplary display of game play on an electronic gaming technology device or machine.

Turning now to FIG. 2, there is illustrated therein the display elements of the game as displayed on the display screen 20 prior to commencement of game play. The display screen 20 may display a variety of information and features, which may include the following on-screen elements: a ball-draw indicator 34 which provides a visual indication of the number of balls 30 that will be drawn per play during game play, based upon user selection using ball position indicators 38; a winning patterns ledger 40, which shows what patterns win and how much each of the winning patterns will pay, in multiples of the bet; a "game mode" indicator 42 comprising a number of balls 30 displayed on the left side, and a bet indicator 32 displayed on the right side; a card selection indicator 44 which displays a column of indications each containing matrix shapes representing cards; and a matrix of x cards 28 numbered according to the selection indicated from the card selection indicator 44. It should be noted that the card selection indicator 44 and the game mode indicator 42 may act as selection mechanism "soft-keys" or touchscreen input buttons, in accordance with the description of the display screen 20, which may comprise a touchscreen. The remaining on-screen items may include a bet indicator 50, which duplicates the bet portion of the "game mode" selection indication from game mode indicator 42; a message indicator 52; and the display of user credits 54. The display elements may also include a volume control 58, a credit denomination 60, and a help button 62. Each bingo card 28 bears a plurality of numbers, symbols and/or other values to be matched to numbers, symbols or other values depicted on the balls 30 in a manner yet to be described.

Game play is implemented by receiving one or more player inputs on the EGT indicating a number of balls selected for drawing in the electronic game. The display screen 20 displays the number of balls 30 selected for drawing in the electronic game using at least a physical representation of each ball selected. Upon receiving the player input selecting the number of balls to be drawn, the game draws the number of balls in accordance with the player input.

Figure 3:
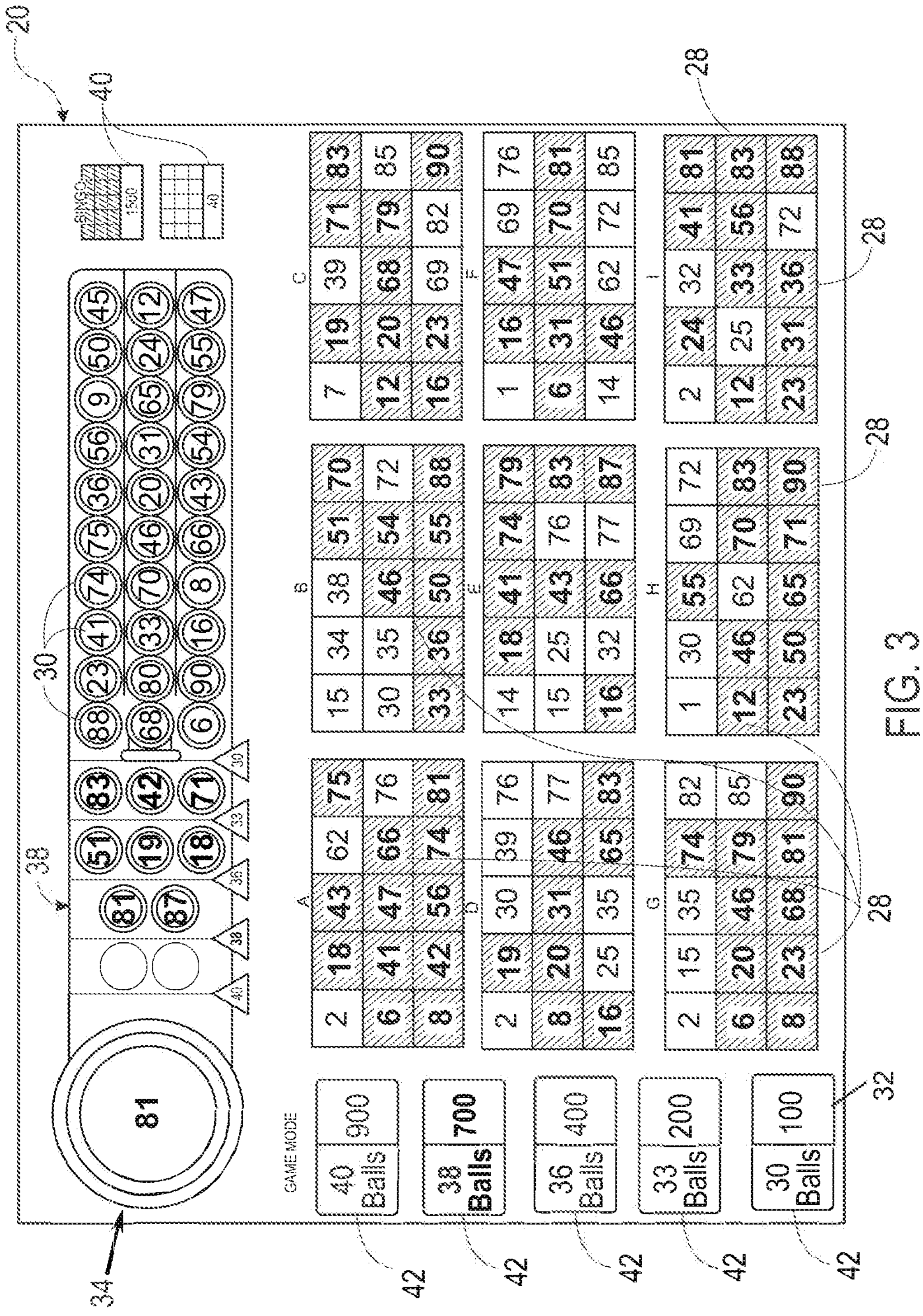
FIG. 3 illustrates an exemplary display at the beginning stage of gameplay for one implementation of the present invention.

FIG. 3 illustrates the elements of FIG. 2 after a game play is initiated. A minimum selection, or fixed number x of balls 30 is determined or pre-set by the game. By way of example, x may be 30, but it will be appreciated that the fixed number x of balls 30 may be any number set by the game. In the game mode, the player selects a number y of balls 30 to be drawn referred to as the selection of the game mode. The game mode number y of balls 30 to be drawn by the player is equal to or exceeds the fixed number x of balls 30 set by the game. Using the controls 16, the player selects a game mode 42, indicating a number y of balls to be drawn for game play. Ball-draw indicator 34 is now populated with game mode number y of balls 30, each bearing a value, wherein the ball-draw indicator 34 indicates the number y of balls 30 selected by the player.

It will be appreciated that the ball draw indicator 34 may display the game mode selection y of balls in any fashion. In one embodiment of the invention, the ball draw indicator 34 displays the minimum selection or fixed number x of balls 30 and a difference z between the game mode selection y of balls and the minimum selection x of balls 30. For example, in one embodiment of the invention, at least a first area of the ball draw indicator 34 is fixed and constantly indicating a minimum selection x required selection of balls 30 and a second area is variable and indicating a difference z between the game-mode selection y of balls 30 and the minimum selection x of balls 30. The minimum selection x of balls 30 are drawn and displayed in the ball-draw indicator 34 according to their number. By way of example, if x equals 30, the first thirty balls 30, being fixed, are displayed in the ball draw indicator 34, for example, in three rows of ten balls in one color scheme, a color scheme being a ball color and contrasting display color for the value of the ball 30. The difference z represents the difference between the game mode number y of balls 30 and the minimum required selection x of balls 30 may be displayed to the left of the minimum selection of balls x in ball position indicator 38 in a differing color scheme. The game mode number y of balls may be represented in the ball draw indicator by a numeric value, in a manner yet to be described.

From the game mode y number of balls 30 drawn, the game matches the values on each ball 30 with a corresponding value on the cards 28. Matching values may be indicated on the cards 28 by highlighting or altering the color or shading on the card 28, by or other means affecting value indication. Player input is received prior to commencement of play indicating a number of one or more cards 28 to be used or played in the electronic game. Winning patterns 40 are displayed on the cards 28 by any number of methods, such as the alteration of color and shading, or other highlighting means affecting matching indication and background of specific numbers of cards 28.

When the EGT is in "stand by", regardless of whether or not credits are available to start a game, the player can choose the game mode number y of balls the player wants to draw by selecting the game mode 42 and the number of cards 28 from the card selection indicator 44.

Figure 4:
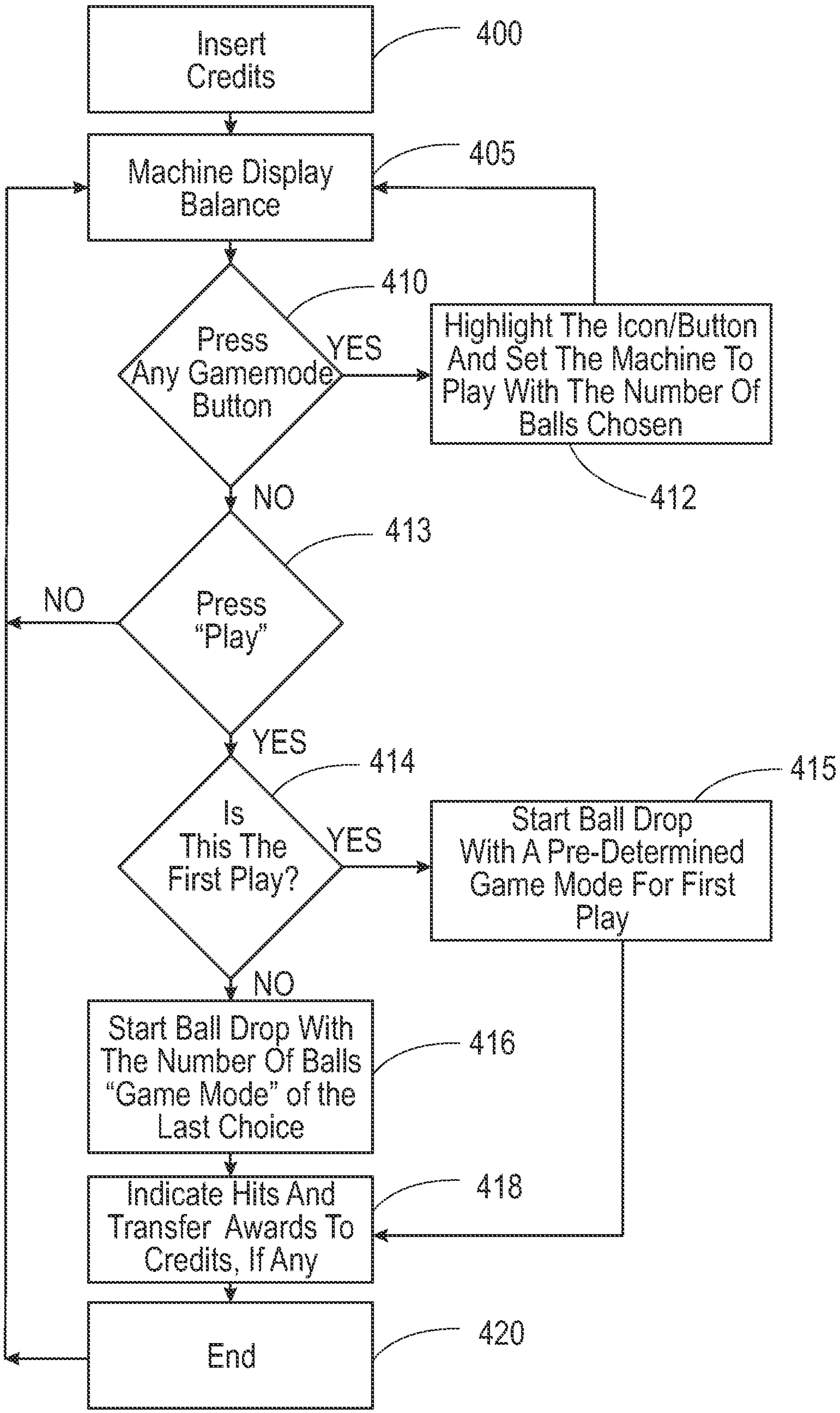
FIG. 4 illustrates an exemplary internal functionality of the gaming software running on the gaming machine wherein the mode of play and number of balls are selected by the player or are pre-selected by the game.

Turning now to FIG. 4, there is illustrated an exemplary internal functionality of the gaming software running on the EGT 10. The invention allows the player before starting a game to choose the game mode number y of balls 30 using a controller 16 for selection of a number of balls. When the machine is in "stand by" regardless of whether or not credits are available to start a game, the player can choose how many balls to draw selecting by the game mode. This can be done via specific hard buttons on the EGT 10, or by the touch screen on the display 20.

Credits are inserted into the EGT 10 at step 400 with the display screen 20 displaying the balance of credits in step 405. To start a game, the player insert credits in the EGT 10 which may be done by inserting notes, a pin number, a magnetic card, a microchip card, detecting a proximity indicator such as a radio frequency identifier device (RFID), biometric identification, providing on the display screen 20 an address for transmission of cryptographic currency, and numerous other ways. When a game mode is activated in step 410, the corresponding icon on the display screen 20 is highlighted in step 412. The buttons light up when touched, to show the player the chosen game mode 42.

After pressing the "Play" button in step 413, the game determines whether this is the first play, at step 414, and, if yes, the game will choose a pre-determined game mode for the first play, at step 415. The ball drop is the executed at step 416 in accordance with the predetermined game mode set for the first play.

If it is not the first play, and the player does not select a game mode, then the choice of the last player will be automatically used as shown at step 416. Other than the first play, pressing the "Play" button initiates the game starts in the game mode of the most recent choice. The game mode of the last game is active until a new game mode is chosen. If desired, before starting a game, the player can change the game mode. The game mode cannot be changed after the ball draw has started and until the game is ended.

In step 416, balls 30 are drawn according to the game mode number y designated by the game mode indicator 42, and at step 418, rewards are determined by the system according to the matching of balls y drawn and the indicated hits or matches. Matches occur when a value on a ball 30 and one of the values on a card 28 contain the identical or matching value. It is possible for single ball 30 to create matches on multiple cards 28. The greater the number y of balls 30 a player selects, the higher the odds of winning, so the bet requirement increases when the user selects a higher number y of bingo balls 30. The game allots one play per game mode selected and ends 420 after matching values on the cards 28 and balls 30.

Figure 5A:
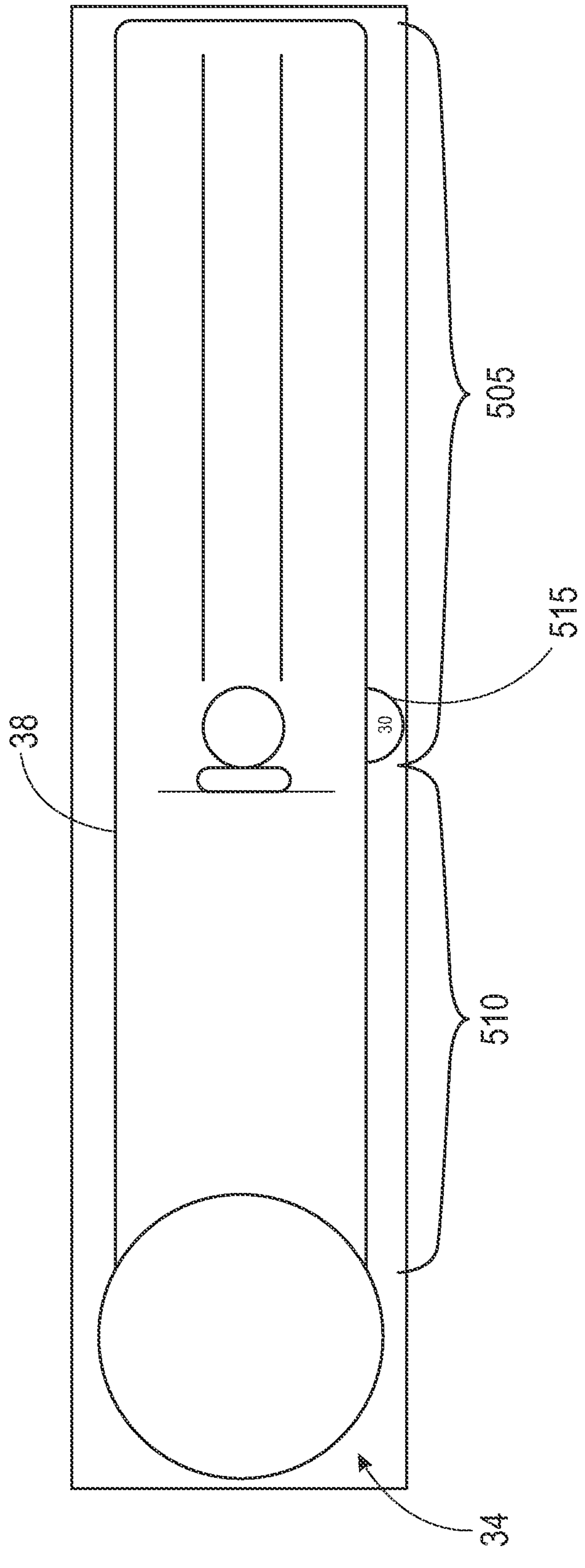
FIGS. 5A-5E illustrate an exemplary ball selection indicator in the various stages of preselection of the number of balls.

The ball draw indicator 34 will now be explained in greater detail. Turning to FIGS. 5A through 5E, an exemplary ball draw indicator 34 is shown in various stages of game play. It will be appreciated that the ball draw indicator 34 may display the game mode selection y of balls in any fashion. As shown in FIG. 5A, the minimum selection x of balls 30 is thirty; however, it will be appreciated that any number x could be used in coordination with a bingo game based on the features of the game.

Area 505 of the display element 34 displays the current number of balls y selected by the user. Area 510 of the display element 34 illustrates an exemplary area where the additional variable number z of balls is represented. The display element may further comprise place holder images illustrating or representing the number of balls x and z and may further indicate the number y of balls. The place holder images may be either a geometric or non-geometric shape.

By way of example, FIG. 5A illustrates a game mode selection 515 y of thirty balls 30 performed by the game mode indicator 42. Area 510 displays no additional items because x=y in this example of game mode. Area 515 displays the game mode number y=30.

Figure 5B:
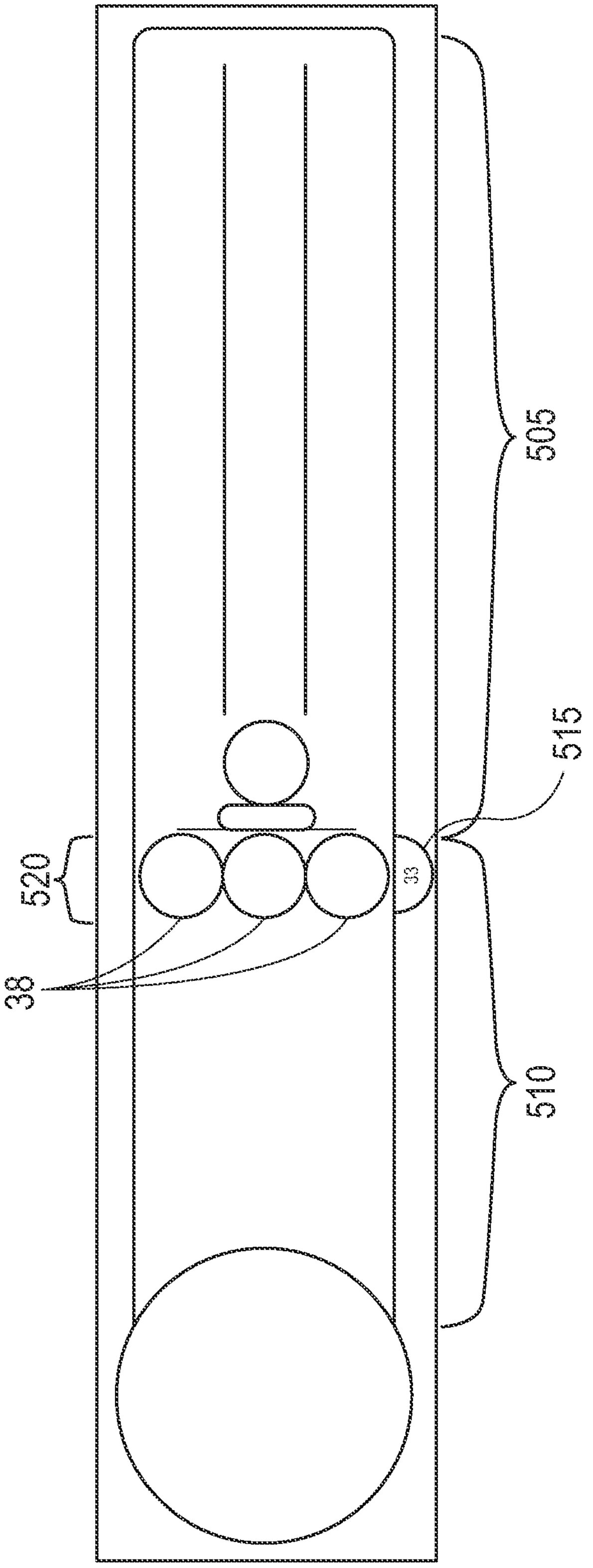

By way of example, FIG. 5B illustrates a game mode y selection 515 of thirty-three balls 30 performed by the game mode indicator 42. Area 510 contains an additional column, comprising three ball position indicators 38 arranged vertically, indicated under reference 520. Area 515 is displayed under reference 520 and displays the game mode number wherein y=33. The ball draw indicator 34 displays at area 505 the minimum selection or fixed number x of balls 30 and at area 510 the difference z between the game mode selection y of balls and the minimum selection x of balls 30, wherein z=3.

Figure 5C:
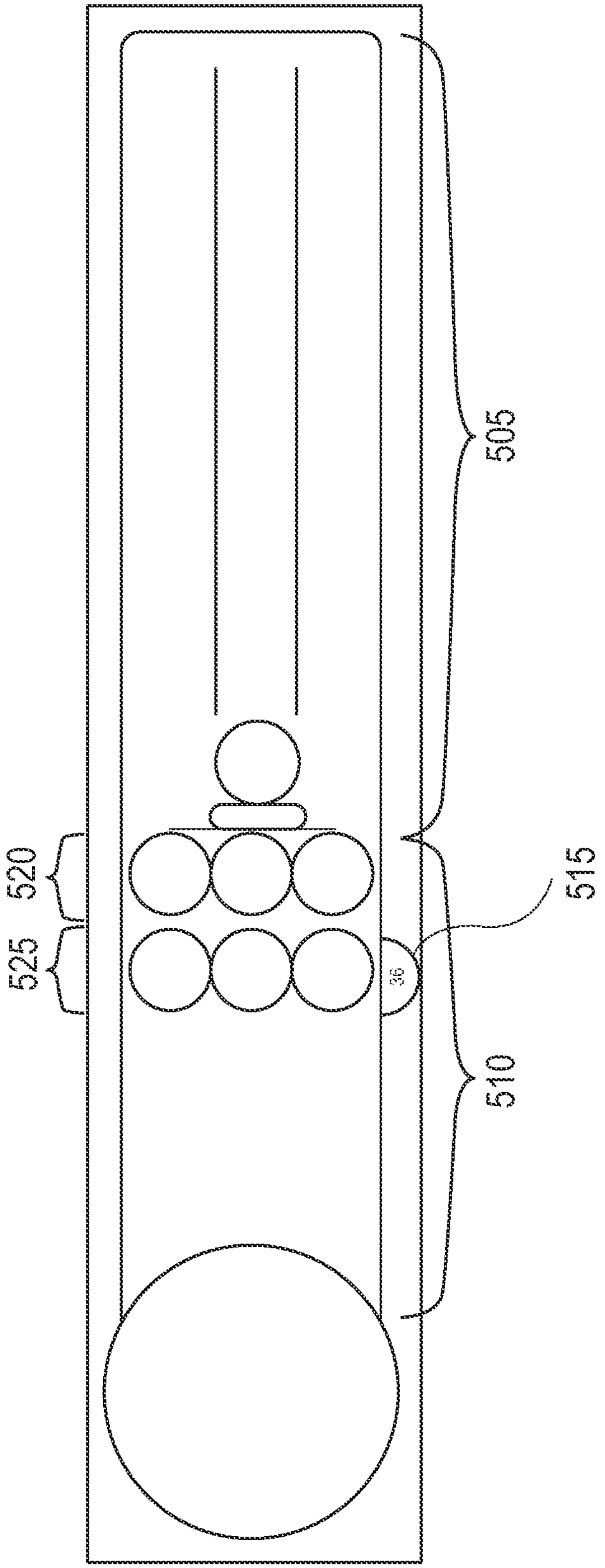

By way of example, FIG. 5C illustrates a game mode selection of thirty-six balls 30 performed by the game mode indicator 42. Area 510 contains two additional columns, comprising three bingo ball position indicators 38 for a total of six. The columns of position indicators are highlighted, and indicated as items 520, and 525. Item 515 is displayed under item 525 and displays the game mode number wherein y=36. The ball draw indicator 34 displays at area 505 the minimum selection or fixed number x of balls 30 and at area 510 the difference z between the game mode selection y of balls and the minimum selection x of balls 30, wherein z=6.

Figure 5D:
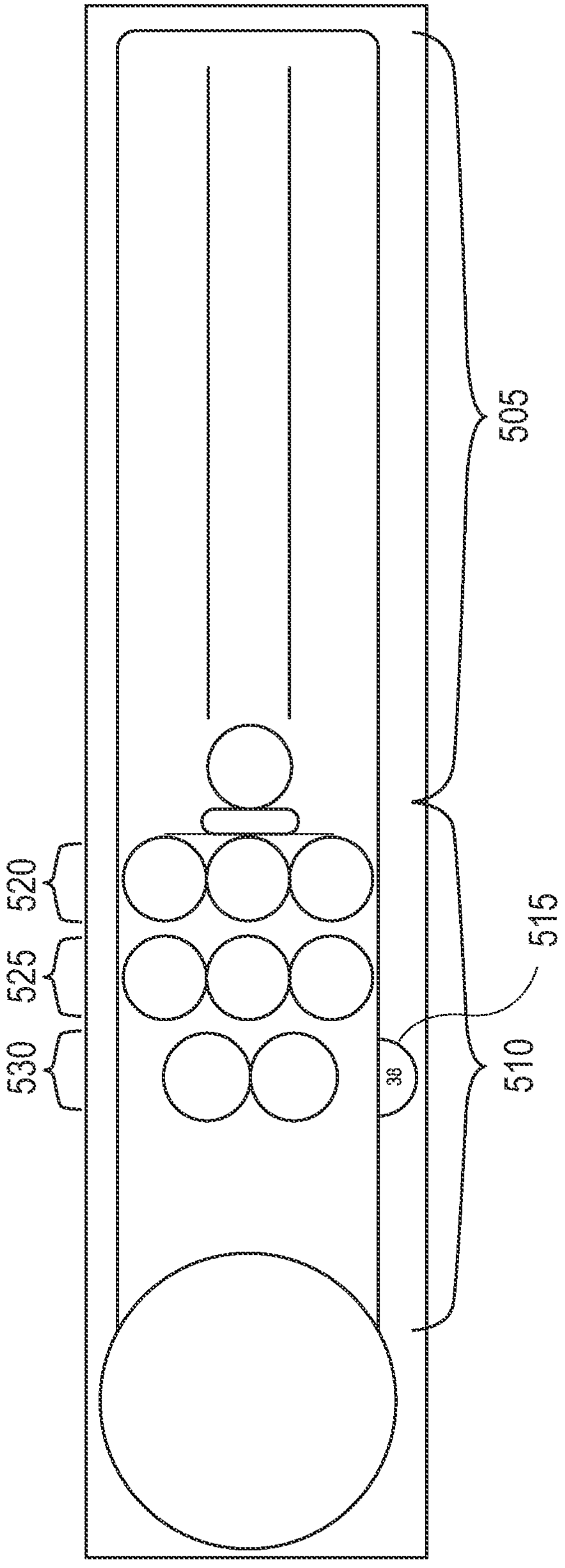

FIG. 5D illustrates a game mode selection of thirty-eight balls 30 performed by the game mode indicator 42. Area 510 contains items 520, 525, and 530 which represent columns, comprising three, three and two bingo ball position indicators 38 respectively, for a total of eight bingo ball position indicators 38. Area 515 is displayed under item 530 and displays the game mode number wherein y=38. The ball draw indicator 34 displays at area 505 the minimum selection or fixed number x of balls 30 and at area 510 the difference z between the game mode selection y of balls and the minimum selection x of balls 30, wherein z=8.

Figure 5E:
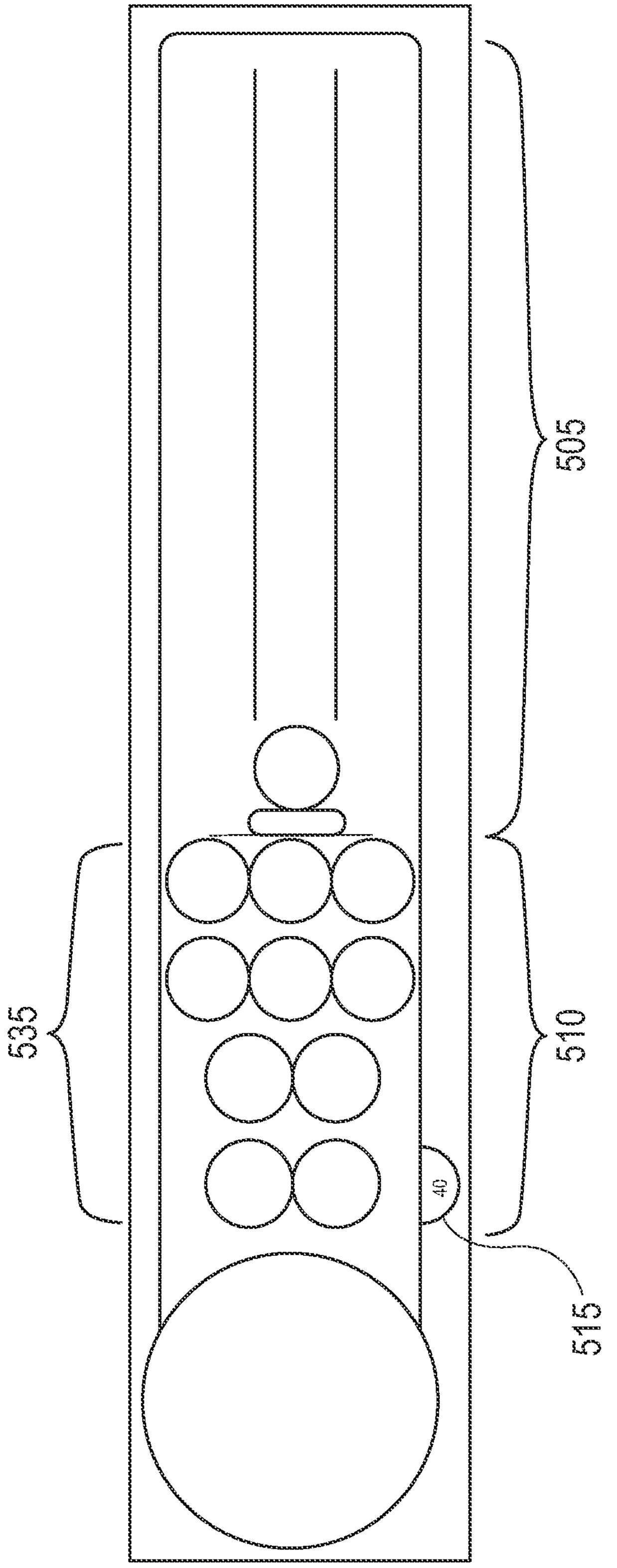

FIG. 5E illustrates a game mode selection of forty balls 30 performed by the game mode indicator 42. Area 510 contains items 520, 525, 530 and 535 which represent columns, comprising three, three, two and two bingo ball position indicators 38 respectively, for a total of ten bingo ball position indicators 38. Area 515 is displayed under item 535 and displays the number wherein y=40. The ball draw indicator 34 displays at area 505 the minimum selection or fixed number x of balls 30 and at area 510 the difference z between the game mode selection y of balls and the minimum selection x of balls 30, wherein z=10.

Upon user initiation of game play, by controls 16 on the EGT 10 or other comparable means, ball draw indicator 34 will be populated with bingo balls 30 according to user selection and in the positions delineated by items 505, 520, 525, 530, and 535 according to the examples described above.

Figure 6:
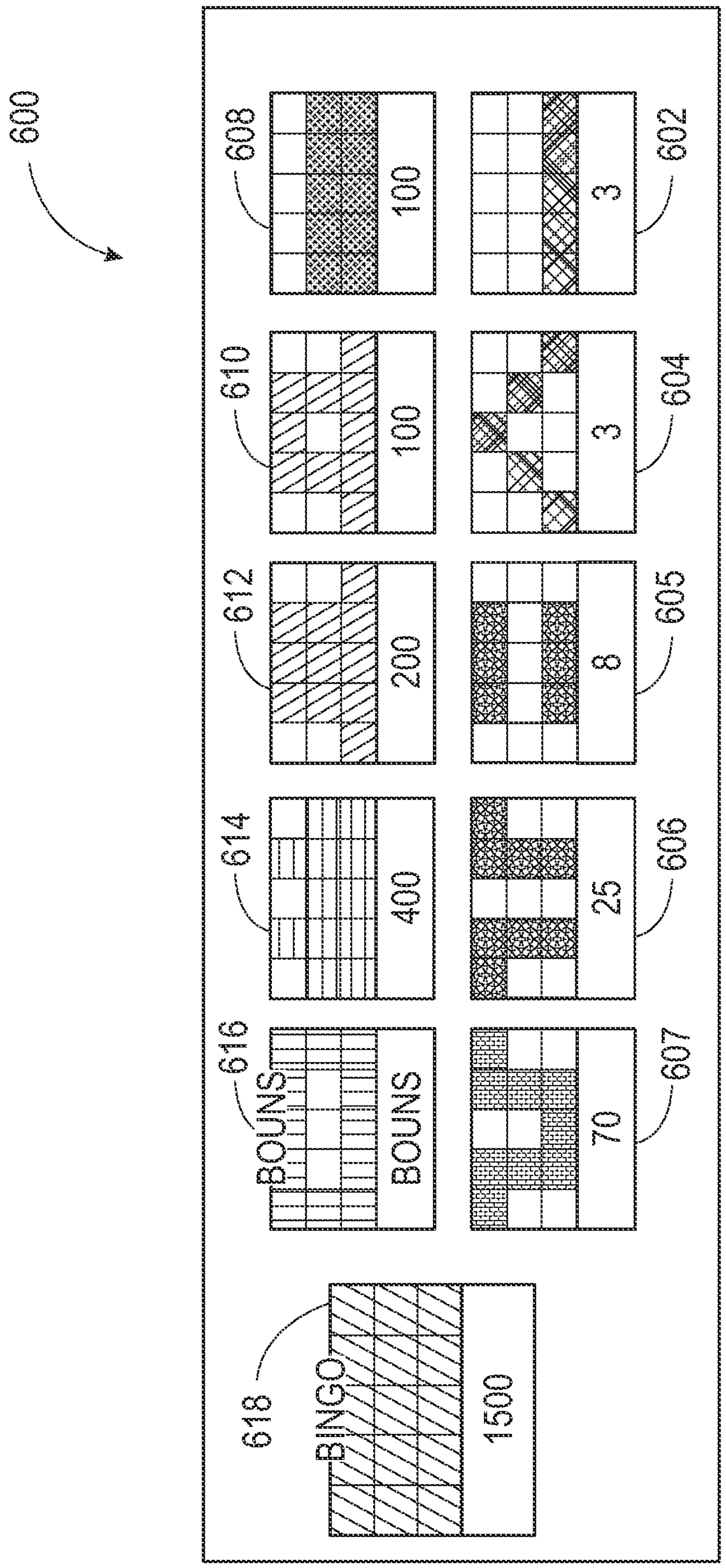
FIG. 6 illustrates an exemplary winning pattern that will be determined by the present invention.

Turning now to FIG. 6, exemplary patterns are illustrated for matches/hits on cards 28 and the amounts of rewards. Item 602 indicates a single complete line which will be rewarded by three times the bet indicated by the bet indicator 50. Item 604 indicates a peak, which will be rewarded by three times the bet indicated by bet indicator 50. Item 605 indicates parallel groups of three spaces in a row, which will be rewarded by eight times the bet indicated by the bet indicator 50. Item 606 indicates by way of example a winning shape defined by two inverted "L-shapes," which will be rewarded by twenty-five times the bet indicated by the bet indicator 50. Item 607 indicates by way of example two inverted "L-shapes," and the center space of the bottom row, which will be rewarded by seventy times the bet indicated by the bet indicator 50. Item 608 indicates by way of example two completed rows, which will be rewarded by one-hundred times the bet indicated by the bet indicator 50. Item 610 indicates by way of example a top row where the center three positions are matched, a second row where the second and fourth positions are matched, and a bottom row which is completed. This pattern will be rewarded by one hundred times the bet indicated by the bet indicator 50. Item 612 indicates by way of example a top row where the center three positions are matched, a second row where the center three positions are matched, and a bottom row which is completed. This pattern will be rewarded by two-hundred times the bet indicated by the bet indicator 50. Item 614 indicates by way of example a first row where the second and fourth position are matched and a second and third row are completed. This pattern will be rewarded by four hundred times the bet indicated by the bet indicator. Item 616 indicates a first row and a third row that are completed and a second row where the first and last position are completed. This pattern will be rewarded by a bonus indicated by the bet indicator 50. Item 618 indicates a bingo card wherein every space is completed. This pattern will be rewarded by fifteen-hundred times the bet indicated by the bet indicator 50. When the player achieves the bonus pattern, the game enters another screen separate from the main game, in which there will be other draws and the player can win a random amount of credits or a progressive jackpot, after which, the game returns to the main game.

Figure 7:
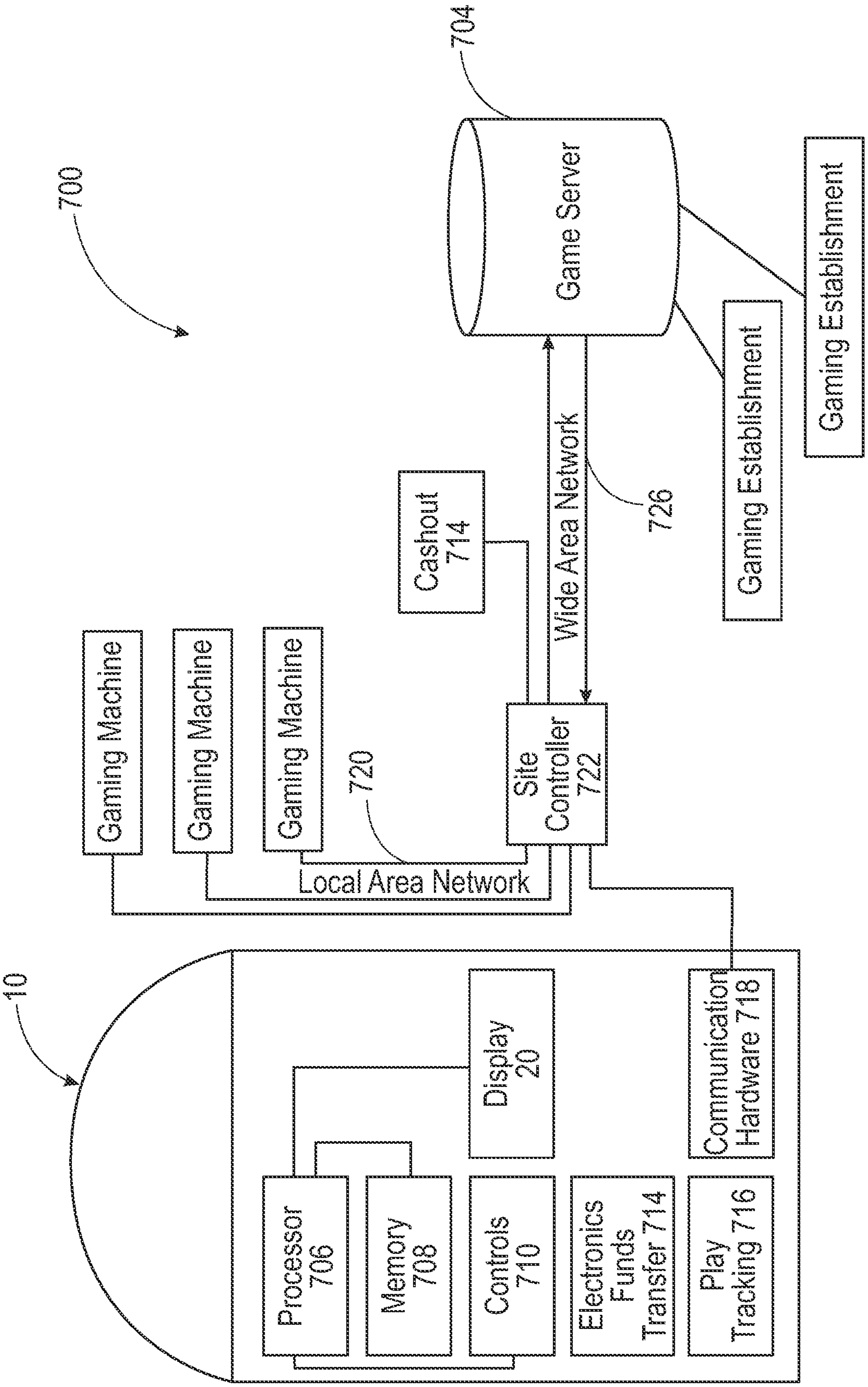
FIG. 7 is a block diagram illustrating an exemplary number of gaming machines that may be configured to implement some embodiments of the present invention, either as stand-alone machines or devices or as part of a network.

It will be appreciated that the invention may be employed on a standalone EGT 10. Alternatively, one embodiment of the invention involves the use of a network of computer implemented EGT's 10. Turning to FIG. 7, the EGT's comprise one or more processors, storage media, means of electronic communication between said machines and software residing on said machines to carry out the inventive functions of electronically based cards and bingo ball selection. The EGT 10 comprises a processor 706 connected to a physical memory device 708 as well as controls 710. The controls 710 may be buttons or keyboards, mice, touchscreens, or any other input system. The EGT 10 further comprises a display 20, an electronic funds transfer module 714, a player tracking module 716, and a communications module 718. The electronic funds transfer module 714 interfaces with payment systems including banking system, credit/debit card networks, cryptocurrency networks, and in-house player reward systems. The communications module 718 interfaces with a site controller 722 which may control several EGT's 10 through a local are network 720. The local area network 720 may be implemented through physical cables or wireless means (not shown) such as short distance radio frequency communications Bluetooth®. The site controller 724 monitors the local machines and provides payout data to the cash out interface 724, which may constitute automated or human-involved means.

The site controller 722 connects to the game server 704 using a wide area network (WAN). Wide area networks may be implemented using long distance radio frequency means as well as coaxial cable, fiber optics, digital subscriber lines, and other means of long-distance data communications. EGT's 10 can run local or wide area progressive jackpots, redemption prizes, etc. In order for this to happen all EGM's must be connected by a network. With the Local Area Network (LAN), common prizes that can be shared with players in the same connection, in which an internet connection is not necessary. Rather, the connection is made by wires or optical fibers and can be done by the casino technicians.

To the WAN may be connected different casinos and share prizes between players in different casinos, which requires an internet connection and a central system based in data center that connects with the local servers installed in the casinos. This connection is made by wire, optical fiber or radio. The system installed in the casino may consist of one server computer connected to the main switcher using a LAN cable, from the main switcher using LAN cables EGT's can be directly connected in case of a small number of EGT's, or to another switcher for each bank of EGT's in case of a high quantity of EGT's installed.

In operation the game is played on a device for playing an electronic game comprising a processor; a visual display screen; and a computer-readable medium; wherein the device generates responsive to a user selection for the electronic game a group of one or more electronic cards wherein each card comprises a matrix of positions, each position comprising an assigned value taken from a finite set of pre-determined numbers and/or symbols and/or other values; displaying on the display screen the group of cards wherein the matrix of values is displayed for each card; providing the user on the display screen, a selection designating a number of balls for drawing, the selector providing a visual preview of the number of balls that will be drawn responsive to user selection until said selection is finalized; responsive to user selection drawing a group of balls comprising a group of values selected from the set of predetermined values, wherein the number of balls drawn is determined by input from a user; generating, on the visual display screen, a visual indicator comprising the values of the balls drawn responsive to the finalization of user selection; comparing the symbolic value of each ball in said group of bingo balls to the symbolic value of each position in the matrix of positions in each electronic card of the one or more electronic bingo cards of the electronic game to and creating a match corresponding to the symbolic value of said position if a match is determined possible; for each matrix of positions corresponding to a card, determining if there are matches present in a pattern pre-designated as a winning pattern, and designating the card as a winning card in association with said particular winning pattern and assigning a numeric value greater than zero to the card based upon its numeric value; and provide rewards to the user based on reward values associated with a pay-table corresponding to any winning patterns determined.

The invention has been described above both generically and with regard to specific embodiments and methods. Although the invention has been set forth in what has been believed to be preferred embodiments, and methods a wide variety of alternatives known to those of skill in the art can be selected with a generic disclosure. Changes may be made in the combination and arrangement of the various parts, elements, steps and procedures described herein without departing from the spirit and scope of the invention as defined in the following claims.

I claim:

1. A computer-implemented method for operating an electronic game based on cards having a matrix of values and draw balls to match with the values on the cards, the method performed by at least one hardware device including a processor, a visual display screen, and a non-transitory computer-readable medium, the method comprising:

prior to play of the electronic game, receiving input on the at least one hardware device indicating a game mode user selection designating a number y of balls selected for drawing in the electronic game, wherein y equals a fixed minimum required number x of balls plus and an additional variable number z of balls determined by the game mode user selection;

generating a display element on the visual display screen visually indicating the number y of balls selected for drawing in the electronic game using at least a physical representation of the number y of balls selected for drawing; and upon receiving the input, determining the selection of the number y of balls selected for drawing and drawing the number of balls y in accordance with the input indicating the game mode user selection until the number y of balls selected for drawing have all been drawn.

2. The computer implemented method of claim 1, wherein the display element on the visual display screen visually indicating the number y of balls selected for drawing indicates at least a first area indicating the fixed minimum required number of balls x and a second area indicating the additional variable number z of balls.

3. The computer implemented method of claim 2, wherein an additional game mode user selection input is received prior to commencement of play, the additional game mode user selection indicating a number of one or more cards to be used during play in the electronic game.

4. The computer implemented method of claim 3, wherein the display element further comprises place holder images illustrating the number of balls x and z and further indicates the number y of balls.

5. The computer implemented method of claim 4, wherein the place holder image is a geometric or non-geometric shape or image displaying a value.

6. The computer implemented method of claim 4, wherein the input of the game mode user selection indicating the number y of balls and the input indicating a number of one or more cards to be used varies gameplay and affects game mechanics.

7. The computer implemented method of claim 4 wherein the number of balls y drawn in response to the game mode user selection remains visible on the display element in the first area indicating the fixed minimum required number of balls x and a second area indicating the additional variable number z of balls until the number y of balls selected for drawing have all been drawn.

8. The computer implemented method of claim 7 further comprising the step of displaying a plurality of options on the display element for the game mode user selection designating the number y of balls selected for drawing in the electronic game, wherein y equals a fixed minimum required number x of balls plus and an additional variable number z of balls determined by the game mode user selection and allowing the player to choose from the plurality of options on the display element the game mode user selection prior to game play.

9. A system for providing an electronic game performed on one or more hardware devices, including one or more gaming interfaces comprising a visual display screen, a processor and a non-transitory computer-readable medium, wherein the one or more gaming interfaces:

prior to play of the electronic game, receives input on the at least one hardware device indicating a game mode user selection designating a number y of balls selected for drawing in the electronic game, wherein y equals a fixed minimum required number x of balls plus an additional variable number z of balls determined by the game mode user selection;

generating a display element on the visual display screen visually indicating the number y of balls selected for drawing in the electronic game using at least a physical representation of the number y of balls selected for drawing; and upon receiving the input, determining the selection of the number y of balls selected for drawing and drawing the number y of balls in accordance with the input indicating the game mode user selection until the number y of balls selected for drawing have all been drawn.

10. The system of claim 9, wherein the display element on the visual display screen visually indicating the number y of balls selected for drawing indicates at least a first area indicating the fixed minimum required number of balls x and a second area indicating the additional variable number z of balls.

11. The system of claim 8, wherein an additional game mode user selection input is received prior to commencement of play, the additional game mode user selection indicating a number of one or more cards to be used during play in the electronic game.

12. The system of claim 11, wherein the display element further comprises place holder images illustrating the number of balls x and z and further indicates the number y of balls.

13. The system of claim 12, wherein the place holder image is a geometric or non-geometric shape or image containing symbolic values.

14. The system of claim 12, wherein the input of the game mode user selection indicating the number y of balls and the input indicating a number of one or more cards to be used varies gameplay and affects game mechanics.

15. The system of claim 12 wherein the number of balls y drawn in response to the game mode user selection remains visible on the display element in the first area indicating the fixed minimum required number of balls x and a second area indicating the additional variable number of balls until the number y of balls selected for drawing have all been drawn.

16. The system of claim 15 further comprising generating a plurality of options on the display element for the game mode user selection designating the number y of balls selected for drawing in the electronic game, wherein y equals a fixed minimum required number X of balls plus and an additional variable number z of balls determined by the game mode user selection and allowing the player to choose from the plurality of options on the display element the game mode user selection prior to game play.

17. A non-transitory computer-readable storage medium that, when combined with a programmable device for playing an electronic game, the programmable device having a visual display screen, performs the following functions:

prior to play of the electronic game, receiving input on the programmable device indicating a game mode user selection designating a number y of balls selected for drawing in the electronic game, wherein y equals a fixed minimum required number x of balls plus and an additional variable number z of balls determined by the game mode user selection;

generating a display element on the visual display screen visually indicating the number y of balls selected for drawing in the electronic game using at least a physical representation of the number y of balls selected for drawing; and upon receiving the input, determining the selection of the number y of balls selected for drawing and drawing the number of balls y in accordance with the input indicating the game mode user selection until the number y of balls selected for drawing have all been drawn.

18. The computer-readable medium of claim 17, wherein the display element on the visual display screen visually indicating the number y of balls selected for drawing indicates at least a first area indicating the fixed minimum required number selection of balls x and a second area indicating the additional variable number z of balls.

19. The computer-readable medium of claim 18, wherein an additional game mode user selection input is received prior to commencement of play, the additional game mode user selection indicating a number of one or more cards to be used during play in the electronic game.

20. The computer-readable medium of claim 19, wherein the display element further comprises place holder images illustrating the number of balls x and z and further indicates the number y of balls.

21. The computer-readable medium of claim 20, wherein the place holder image is a geometric or non-geometric shape or image displaying a value.

22. The computer-readable media of claim 20, wherein the input of the game mode user selection indicating the number y of balls and the input indicating a number of one or more cards to be used varies gameplay and affects game mechanics.

23. The computer-readable medium of claim 20 wherein the number of balls y drawn in response to the game mode user selection remains visible on the display element in the first area indicating the fixed minimum required number of balls x and a second area indicating the additional variable number z of balls until the number y of balls selected for drawing have all been drawn.

24. The computer-readable medium of claim 23 further comprising generating a plurality of options on the display element for the game mode user selection designating the number y of balls selected for drawing in the electronic game, wherein y equals a fixed minimum required number x of balls plus and an additional variable number z of balls determined by the game mode user selection and allowing the player to choose from the plurality of options on the display element the game mode user selection prior to game play.

* * * * *